(12) United States Patent
Goris et al.

(10) Patent No.: US 6,985,718 B2
(45) Date of Patent: Jan. 10, 2006

(54) CHARGE METER SYSTEM AND METHOD OF COMPILING UTILIZATION FEES

(75) Inventors: Norman Goris, Dortmund (DE); Lawrence A. Rigge, Emmaus, PA (US); Wolfgang Scheit, Rothenbach (DE)

(73) Assignee: Agere Systems Inc., Allentown, PA (US)

( * ) Notice: Subject to any disclaimer, the term of this patent is extended or adjusted under 35 U.S.C. 154(b) by 169 days.

(21) Appl. No.: 10/464,932

(22) Filed: Jun. 19, 2003

(65) Prior Publication Data

US 2004/0259526 A1 Dec. 23, 2004

(51) Int. Cl.
 *H04M 11/00* (2006.01)
(52) U.S. Cl. ............... 455/407; 455/418; 455/466; 379/114.03
(58) Field of Classification Search ........ 455/405–408, 455/422.1, 445, 466, 418; 379/114.1, 115.1, 379/114.03
See application file for complete search history.

(56) References Cited

U.S. PATENT DOCUMENTS

| | | | |
|---|---|---|---|
| 5,164,937 A * | 11/1992 | Tanabe et al. ............... 370/399 |
| 5,425,085 A * | 6/1995 | Weinberger et al. ... 379/114.02 |
| 5,577,100 A * | 11/1996 | McGregor et al. .......... 455/406 |
| 5,751,799 A * | 5/1998 | Mori .................... 379/114.09 |
| 5,946,670 A * | 8/1999 | Motohashi et al. ......... 705/400 |
| 6,198,915 B1 * | 3/2001 | McGregor et al. .......... 455/406 |
| 6,650,887 B2 * | 11/2003 | McGregor et al. .......... 455/406 |
| 6,775,519 B1 * | 8/2004 | Wiedeman et al. ........ 455/12.1 |
| 6,819,672 B1 * | 11/2004 | Corneliussen ............ 370/395.1 |
| 6,829,473 B2 * | 12/2004 | Raman et al. .............. 455/406 |
| 6,847,613 B2 * | 1/2005 | Mimura et al. ............. 370/235 |
| 2001/0000777 A1 * | 5/2001 | McGregor et al. .......... 455/406 |
| 2002/0006780 A1 * | 1/2002 | Bjelland et al. ............ 455/406 |
| 2003/0172136 A1 * | 9/2003 | Katagawa et al. .......... 709/220 |
| 2004/0017905 A1 * | 1/2004 | Warrier et al. ......... 379/114.15 |
| 2004/0018829 A1 * | 1/2004 | Raman et al. .............. 455/406 |

FOREIGN PATENT DOCUMENTS

EP 000808547 B1 * 8/1996

* cited by examiner

*Primary Examiner*—Binh K. Tieu

(57) ABSTRACT

A charge meter system and method of compiling utilization fees associated with a data transmission in a packet switched communications network. In one embodiment, the charge meter system includes a counter that counts a number of data packets associated with the data transmission and a charge rate subsystem that obtains a charge rate associated with the data transmission. The charge meter system also includes a calculation subsystem that calculates utilization fees based on the number of data packets and the charge rate of the data transmission. The charge meter system further includes an indication subsystem that provides the utilization fees to a user via user equipment participating in the data transmission.

6 Claims, 1 Drawing Sheet

CHARGE METER SYSTEM AND METHOD OF COMPILING UTILIZATION FEES

TECHNICAL FIELD OF THE INVENTION

The present invention is directed, in general, communications systems and, more particularly, to systems and methods for compiling utilization fees associated with a data transmission in a packet switched communications network.

BACKGROUND OF THE INVENTION

The fees allocated to a packet switched data transmission, such as a data transmission associated with a General Packet Radio Service ("GPRS") according to the European Telecommunications Standard Institute Section 3.60, which is incorporated herein by reference, are often based on the amount of data transmitted instead of the time associated with the data transmission. During a transfer of data, the user of the service may not be aware of the accumulated charges or utilization fees to be charged to an account. As an example, the user may not be aware of the charges allocated to a prepaid card of the user or to the user equipment assigned thereto.

Accordingly, what is needed in the art is a system and method for compiling utilization fees for user equipment associated with a data transmission in a packet switched communications network and for informing a user about the fees to be charged thereto.

SUMMARY OF THE INVENTION

To address the above-discussed deficiencies of the prior art, the present invention provides a charge meter system that calculates utilization fees associated with a data transmission in a packet switched communications network. In one embodiment, the charge meter system includes a counter that counts a number of data packets associated with the data transmission and a charge rate subsystem that obtains a charge rate associated with the data transmission. The charge meter system also includes a calculation subsystem that calculates utilization fees based on the number of data packets and the charge rate of the data transmission. The charge meter system further includes an indication subsystem that provides the utilization fees to a user via user equipment participating in the data transmission.

In another aspect, the present invention provides a method of compiling utilization fees associated with a data transmission in a packet switched communications network. In one embodiment, the method includes counting a number of data packets associated with the data transmission and obtaining a charge rate for the data packets of the data transmission. The method also includes calculating utilization fees based on the number of data packets and the charge rate and providing the utilization fees to a user via user equipment participating in the data transmission.

In yet a further aspect, the present invention provides user equipment associated with a data transmission in a packet switched communications network. In one embodiment, the user equipment includes a transmit/receiver unit that transmits data packets associated with the data transmission and a charge meter system. The charge meter system includes a counter that counts a number of data packets associated with the data transmission, and a charge rate subsystem that obtains at least one charge rate associated with the data transmission. The charge meter system also includes a calculation subsystem that calculates utilization fees based on the number of data packets and the charge rate, and an indication subsystem that provides the utilization fees to a user of the user equipment.

Accordingly, the aforementioned systems and method may be performed by the user equipment itself. In this regard, the user equipment, for instance, a mobile station of a GPRS communications network, includes a charge meter system adapted to calculate the utilization fees. The utilization fees are based on the number of data packets relating to at least one data transmission from or to the user equipment and at least one charge rate associated therewith. The user equipment may then provide the utilization fees to the user thereof. The charge rate may be input to the charge meter system via a keypad, touch screen or speech activated input device incorporated into the user equipment.

With regard to ascertaining the number of data packets, in an advantageous embodiment, the user equipment includes a counter connected to a transmit/receive unit for receiving information about the number of data packets prior to, during, or after a transmission of data packets. Alternatively, the charge meter system may be adapted to receive information about the charge rate or about the number of data packets from the packet switched communications network that the user equipment is logged on to or registered with. The charge meter system may manually or automatically download the charge rate and/or the number of data packets from the packet switched communications network.

The systems and method for compiling utilization fees, therefore, provides for control of transmission capacity even in the case of a packet switched communications network. The transfer of data in the packet switched communications network that is subject to a charge can be transparently provided to a user thereby allowing the user to control a level of participation in a data transmission.

In particular, depending on the respective application or the user behavior, the number of data packets may be accounted for and allow for online monitoring of the utilization fees. In accordance therewith, a user may terminate the data transmission at any time. Alternatively, the number of data packets may be counted at a time ready for, but prior to, performing the data transmission to further control participation in the data transmission. Additionally, the utilization fees may be calculated independently for each data transmission or accumulated based on at least one previous data transmission to provide a general control survey.

The systems and subsystems of the charge meter system may be incorporated into the user equipment or separate systems within the packet switched communications network. Upon receiving the utilization fees, the user equipment may employ a display or a loudspeaker to inform the user of the fees. Moreover, to ensure a quick and reliable compiling of the utilization fees, an activation of the packet switched communications system may be achieved by pressing at least one key of a keypad, using a touch screen, or employing a voice activated input device of the user equipment. As a consequence, an activating signal may be transmitted from the user equipment to the packet switched communications system to activate the respective systems and subsystems.

For instance, the activation signal may be transmitted to a switching node unit or a base station in the packet switched communications network that is adapted to transmit information to the user equipment for further processing. The information transmitted via the packet switched communications network to the user equipment may be in response to a user request or download signal, or may be a broadcast signal including, without limitation, the charge rate so that user equipment tuned to that broadcast channel can receive the charge rate for a particular data transmission.

As mentioned above, the systems and subsystems may be incorporated into the user equipment by, for example, incorporating a processor and storage medium that, in conjunction with a sequence of operating instructions, may operate and perform the functions to achieve the intended purpose as described herein. Additionally, currently available user equipment may be retrofitted by the provision of a computer readable program for enabling the above functionality supported by the charge meter system. Moreover, useful transparency and control of incoming data packets may be controlled by the user even in those cases wherein data packets incoming to the user equipment are only partially charged to an account of the user equipment.

Also, tariffs and charges may change from time to time and, of course, may vary depending on geographic location. For ensuring that the utilization fees correspond to the real costs charged to the account, it may be preferable to update continuously, periodically, or by manual or automatic process the charge rate and other parameters that are germane to the calculation of the utilization fees.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
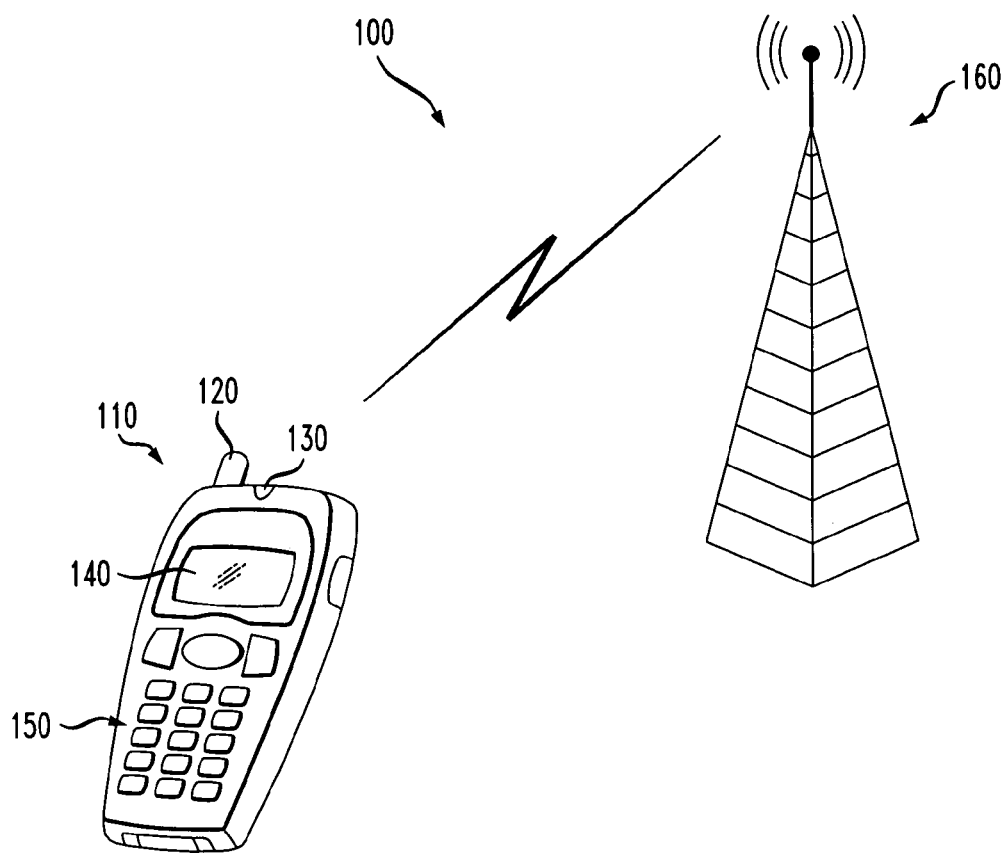
FIG. 1 illustrates a system level diagram of an embodiment of a packet switched communications system including user equipment constructed according to the principles of the present invention.

Referring initially to FIG. 1, illustrated is a system level diagram of an embodiment of a packet switched communications system 100 constructed according to the principles of the present invention. The packet switched communications system includes user equipment (e.g., a mobile station 110) that transmits data, for example based on a short or multimedia messaging service, via a switching node (e.g., a base station 160) of a packet switched communications network (e.g., a GPRS communications network) that the mobile station 110 is logged on to or registered with to another subscriber. The other subscriber may also be registered with the base station 160 or be registered with another switching node or other communications network.

As can be seen, the mobile station 110 includes an antenna 120 which is part of an incorporated transmit/receive unit, a display 130 and a loudspeaker 140 as well as a keypad 150 for inputting data and for selecting from a menu list a certain functionality or routine. The functionality is supported by a processor and storage medium employing general purpose instructions or a specifically adapted subscriber identity module chip located within the mobile station 110. As will become more apparent in relation to the discussion below, in an exemplary embodiment, the mobile station 110 may include a charge meter system adapted to compile utilization fees associated with a data transmission in the GPRS communications network.

Figure 2:
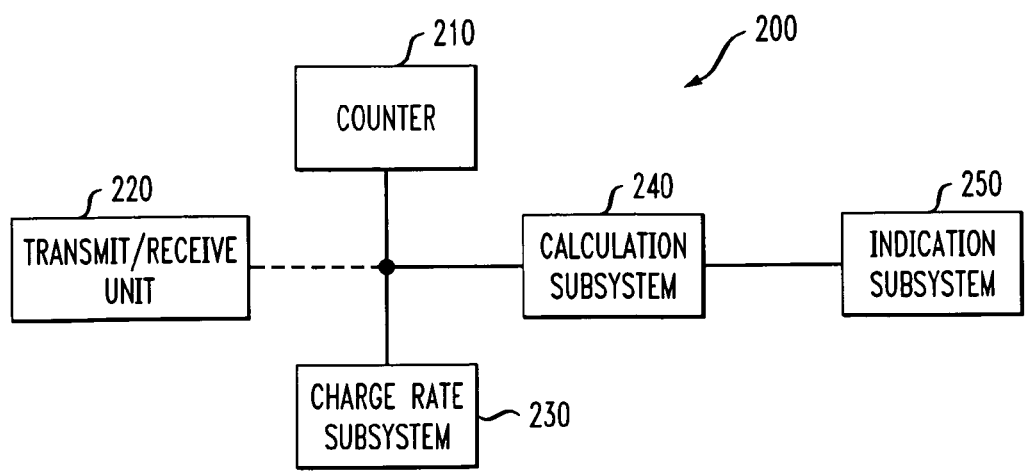
FIG. 2 illustrates a block diagram of an embodiment of a charge meter system constructed according to the principles of the present invention.

Turning now to FIG. 2, illustrated is a block diagram of an embodiment of a charge meter system 200 constructed according to the principles of the present invention. As mentioned above, charge meter system 200 may be incorporated into user equipment (such as a mobile station), be located in systems within a packet switched communications network, or a combination thereof. For purposes of the following, the charge meter system 200 will be discussed in the environment of the user equipment.

The charge meter system 200 includes a counter 210, couplable to a transmit/receive unit 220, adapted to count a number of data packets relating to at least one data transmission in a packet switched communications network. For obtaining at least one charge rate per data packets to be transmitted, the charge meter system 200 includes a charge rate subsystem 230. The charge rate subsystem 230 may include, for example, a storage medium connected with the keypad of the user equipment to manually input one or more constant, fare zone or time (of day) dependent packet based charge rates. Of course, the charge rate may be provided via a touch screen or a speech activated input device of the user equipment. On the basis of the charge rate and the information received from the counter 210 on the number of data packets, a calculation subsystem 230 calculates the utilization fees to be paid by the user for the transmission of the data packets. The utilization fees may be provided via an indication subsystem 250 to the user visually on a display or acoustically by a loudspeaker to the user.

Based on pre-selected settings or according to a user supported selectable setting, the counter 210 in cooperation with the transmit/receive unit 220 may operate in one of the following conditions to better serve the user of the user equipment. The number of data packets may be counted prior to an execution of a data transmission, during the data transmission, in particular, with the possibility to terminate the data transmission at any time, or after the data transmission. In the case that the user equipment is roaming such that the incoming data packets are charged at least partially to an account of the user equipment, the number of data packets can be counted by the user equipment itself merely during or after the data transmission. In a similar way, the calculation subsystem 230 calculates the utilization fees for each data transmission independently or in consideration of previous data transmissions until the calculation subsystem 230 is reset.

Alternatively, the charge meter system 200 may receive the charge rate or the number of data packets from the packet switched communications network to which the user equipment is logged on or registered with. Accordingly, the charge meter system 200 may be embodied within a switching node unit or a base station within the packet switched communications network. In such circumstances the systems and subsystems that form the charge meter system may forward information to the corresponding user equipment for the further processing or merely for the indication at the user equipment. This is preferably realized by transmitting the information to the user equipment in response to a manually or automatically activated user request or download signal. Thus, depending on the specific application, an updating of information which is taken into account for the calculation and/or indication of utilization fees can be performed either by the user equipment or within the packet switched communications network.

Although the present invention has been described in detail, those skilled in the art should understand that they can make various changes, substitutions and alterations herein without departing from the spirit and scope of the invention in its broadest form.

What is claimed is:

1. User equipment associated with a data transmission in a packet switched communications network, comprising:
    a transmit/receiver unit configured to transmit data packets associated with said data transmission; and
    a charge meter system, including:
        a counter configured to count a number of data packets associated with said data transmission,
        a charge rate subsystem configured to obtain at least one charge rate associated with said data transmission, and
        a calculation subsystem configured to calculate utilization fees based on said number of data packets and said charge rate.

2. The user equipment as recited in claim 1 wherein said charge meter system further comprises an indication subsystem configured to provide said utilization fees to a user of said user equipment.

3. The user equipment as recited in claim 1 wherein said counter is configured to count said number of data packets prior to said data transmission.

4. The user equipment as recited in claim 1 wherein said charge rate subsystem is configured to receive said charge rate via one of a keypad, touch screen and speech activated input device incorporated into said user equipment.

5. The user equipment as recited in claim 1 wherein said charge meter system is adapted to calculate utilization fees associated with a plurality of data transmissions in said packet switched communications network and said calculation subsystem is configured to calculate said utilization fees based on at least two of said data transmissions.

6. The user equipment as recited in claim 1 wherein said user equipment is a mobile station associated with said packet switched communications network.

* * * * *